Aug. 31, 1954　　　　M. E. McCLELLAN　　　　2,687,608
SIDE-DELIVERY RAKE

Filed Sept. 17, 1952　　　　　　　　　　　　2 Sheets-Sheet 1

INVENTOR.
MARCUS E. McCLELLAN

ATTORNEYS

Aug. 31, 1954 M. E. McCLELLAN 2,687,608
SIDE-DELIVERY RAKE
Filed Sept. 17, 1952 2 Sheets-Sheet 2
FIG. 3
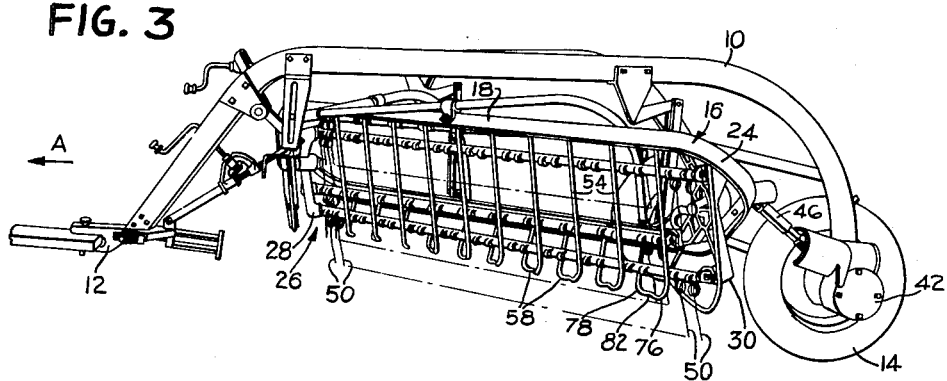
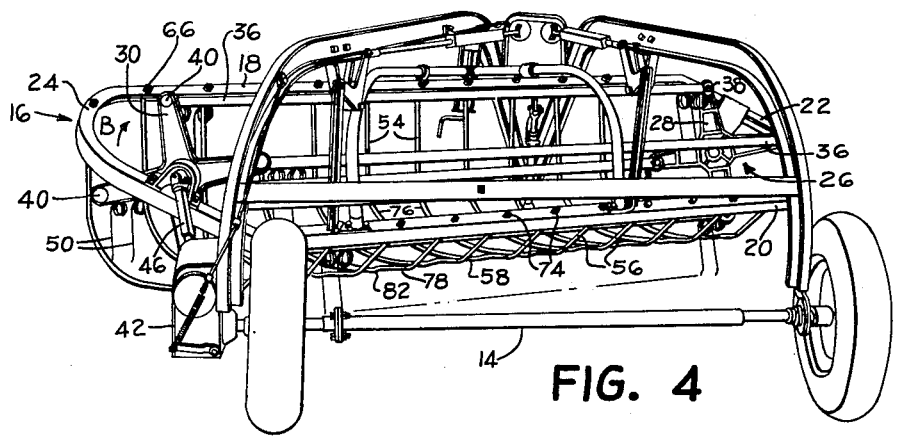
FIG. 4
FIG. 5
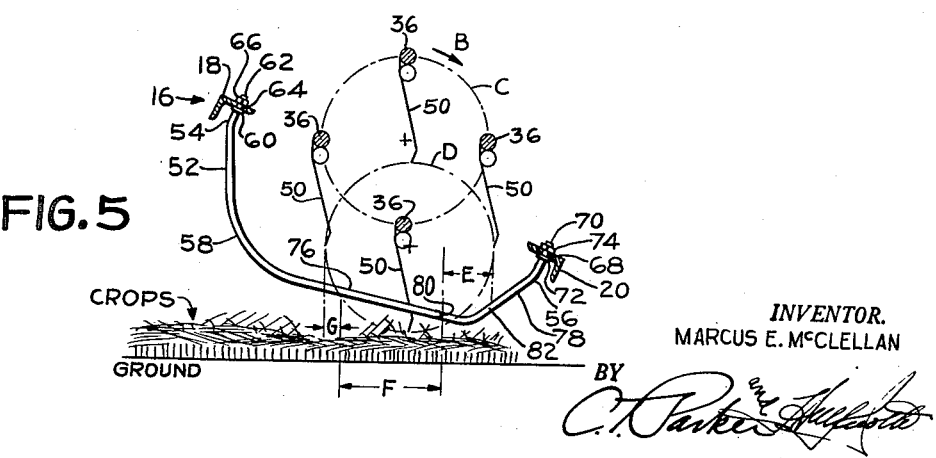
INVENTOR.
MARCUS E. McCLELLAN
BY
ATTORNEYS Patented Aug. 31, 1954

2,687,608

UNITED STATES PATENT OFFICE 2,687,608

SIDE-DELIVERY RAKE

Marcus E. McClellan, Ottumwa, Iowa, assignor to Deere Manufacturing Co., Dubuque, Iowa, a corporation of Iowa Application September 17, 1952, Serial No. 309,992

3 Claims. (Cl. 56—377)

This invention relates to a side-delivery rake and more particularly to improved stripper bar construction for the teeth of the rake reel.

The conventional side-delivery rake comprises a mobile frame adapted to advance over a field in which crops lie on the ground in previously cut swaths. The rake will include a rotatable rake reel arranged generally transversely (usually diagonally) to the line of travel, and the rotation of the reel is such that the teeth travel respectively in individual upright orbits to move downwardly toward the ground, then to engage the crops and move the crops to one side of the machine, and then to depart upwardly from the crops and move then rearwardly to begin a new cycle. The frame or basket in which the reel is supported includes a plurality of strippers extending generally parallel to and interspaced with the orbits of the teeth, the purpose of the strippers, among other things, being to strip the crops from the teeth as the teeth move upwardly in departing from the crops.

Because of the extreme and various loads imposed on the teeth, the stripper members may in some cases be found to interfere with the operation of the rake reel unless the stripper members are adequately designed in the first place and properly adjusted and maintained in operation. For example, it is not uncommon to find that the teeth become bent or otherwise misplaced in such manner that as they move downwardly into engagement with the crop they are apt to straddle or otherwise become entangled with the stripper bars. Normally, the stripper bars are of sufficiently heavy stock to resist distortion and the usual difficulty stems from bent or distorted teeth.

According to the present invention, each stripper bar is improved to the extent that it has an offset rear or trailing portion providing increased clearance for the rake teeth. The stripper bar as viewed from above is of zig-zag shape and the rear offset portion is only a minor portion of its length and its forward or leading portion is a major portion of its length and lies in a straight line closely parallel to that portion of the tooth orbit in which the point of the tooth is engaging crops and moving crops laterally or in a generally forward direction. It is an object of the invention to provide improved stripper bars of the character just referred to which may be simply and inexpensively manufactured and which may be provided as attachments for rakes of conventional design.

The foregoing and other important objects and desirable features inherent in and encompassed by the invention will become apparent as a complete disclosure of a preferred embodiment of the invention is developed in the following description and accompanying sheets of drawings in which Figure 1 is a plan view of one form of side-delivery rake embodying a reel and frame construction incorporating the invention.

Figure 3 is a left side perspective view of the rake of Figure 1.

Figure 4 is a rear perspective view of the rake.

Figure 5 is a schematic view, on an enlarged scale, as seen substantially along the line 5—5 of Figure 1, showing the relation of the rake tooth orbit to the reel frame and a stripper bar.

Figure 2:
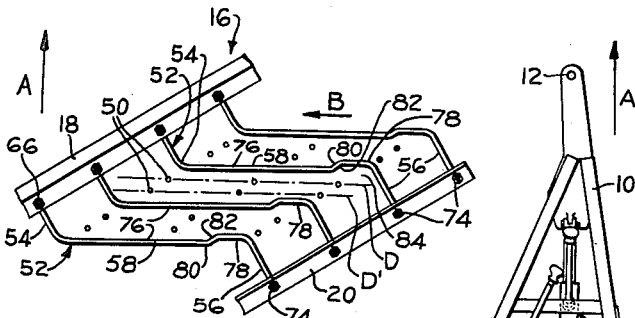
Figure 2 is a fragmentary plan view of a portion of the reel frame or basket and showing particularly the shape of the stripper bars.

The rake comprises generally a longitudinal main frame 10 having at its forward end a hitch member 12 for connection of the frame to a tractor or other draft vehicle for travel in the direction of the arrow A. The frame is supported on its rear end on a wheeled axle assembly 14 and is adapted to advance over a field on which crops lie in previously cut swaths.

Suspended from the main frame 10 and arranged generally transverse to the line of advance is a reel-supporting frame or basket 16. This frame comprises a leading frame member 18 and a trailing frame member 20. These members are in the form of elongated bars having their lengths generally transverse to the line of advance of the rake and disposed parallel to each other, being joined respectively at their opposite ends by end elements 22 and 24.

Figure 1:
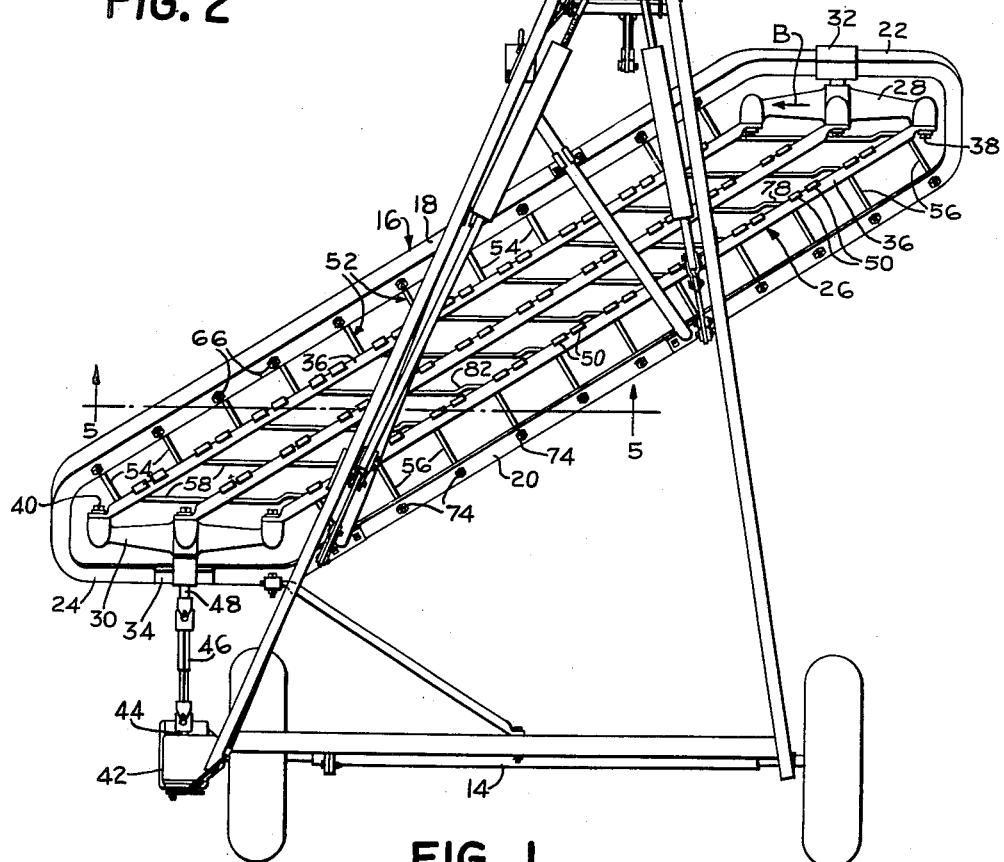

The reel-supporting frame or basket 16 carries a rotatable rake reel designated generally by the numeral 26. This reel as shown here comprises right- and left-hand rotatable spiders 28 and 30 respectively journaled on longitudinal horizontal axes in bearings 32 and 34 respectively fixed to the frame end elements 22 and 24. The spiders 28 and 30 are interconnected by a a plurality (here four) of rake bars or tooth pipes 36. The connection of each end of each rake bar or tooth pipe 36 with its associated spider is effected by a bearing or pivot on an axis parallel to the journaling axis of the spider. For example, the right-hand ends of the bars or pipes 36 are pivoted at 38 to the front spider 28 and are pivoted at 40 to the left-hand or rear spider 30. Consequently, as the spiders rotate in the direction of the arrow B (Figures 1 and 3) the rake bars or pipes 36 are caused to move likewise. That is to say, any point on any of the rake bars will move in a circular path about an axis parallel to the axes of the spiders 28 and 30.

The reel 26 is caused to rotate as described above by drive mechanism including a gear box 42 carried on a left-hand rear portion of the main frame 10 and containing mechanism (not shown) deriving input power from the wheeled axle assembly 14. An output shaft 44 projects forwardly from the gear box 42 and is connected by a suitable telescoping shaft assembly 46 to a reel-input shaft 48 journaled in the bearing 34 and keyed to the left-hand or rear spider 30. These details are unimportant and are described only generally for purposes of orientation.

Each rake bar or pipe 36 carries thereon a plurality of rake teeth 50. The rake teeth and the manner of the mounting thereof on the pipes or bars 36 may be conventional and further description is deemed unnecessary. In the present case, as is usual, the rake teeth are arranged in sets or pairs and the pairs are arranged in uniformly spaced relation lengthwise of the reel 26.

Since any point on any one of the rake bars 36 will describe a circle about an axis parallel to the axes of the spiders 28 and 30, it follows that any point fixed to a rake bar will describe a similar path or orbit. Figure 5 shows at C the circular orbit of the rake pipes 36. The arrow B indicates, as before, the direction of rotation of the reel. Each of the rake teeth 50 is affixed to its pipe so that it depends therefrom as illustrated. Consequently, the point of any tooth will travel in a closed curvilinear orbit, here a circular path D, and the direction of movement will, of course, be as indicated at B. The reel frame 16 and its leading and trailing frame bars 18 and 20 are disposed above the ground and of course support the reel 26 for rotation above the ground. In Figure 5, crops are designated schematically as lying on the ground in previously cut swaths. It will be observed that the lower part of the orbit or circular path D cuts or intersects the crops and it will be seen that, considering the rearwardmost tooth 50, the point of this tooth moves downwardly ahead of the rear or trailing frame bar 20 in a crop-approaching zone E. From this zone or phase, the point of the tooth moves in a lower part of its orbit D through a crop-moving phase F and in a direction toward the leading frame bar 18. In a rake of the type shown in Figure 1, the crops will be moved to the left-hand side of the machine to form a windrow in a well-known manner.

The point of the tooth 50 leaves the crop-moving phase F to move into a departure phase G in which the point of the tooth moves upwardly behind the leading frame bar 18 and then moves in a direction toward the trailing frame bar 20 to begin a new cycle. It will be appreciated that each of the sets of teeth lengthwise along the reel moves in its individual orbit and the reel rotates at an appreciable speed as the rake advances so that the windrows are quickly and efficiently formed. However, for the purposes of the present invention, it is deemed necessary to break down the fundamental operation of a single set of teeth. (By "set" of teeth is meant those teeth that lie in a common radial plane. Hence, the point of any tooth in that set will travel in the same orbit.)

The reel-supporting frame or basket 16 includes a plurality of tooth-strippers arranged in uniformly spaced relation lengthwise of the reel to be interspaced with the rake teeth. Each stripper is designated generally by the numeral 52 and is in the form of a U-shaped member, as viewed from the side, including leading and trailing legs 54 and 56 affixed respectively to the leading and trailing frame bars 18 and 20, and a bight 58 joining the legs and arranged substantially coextensively with the lower part of the rake tooth orbit D. The leg or free end 54 of the stripper 52 is shouldered at 60 and threaded at 62 to pass through an aperture 64 in the leading frame bar 18 and to receive a nut 66, all of which constitutes means for fixing the free end portion or leg 54 of the member 52 to the frame bar 18. The trailing frame bar 60 has an aperture 68 therein for receiving a threaded end portion 70 on the free end 56 of the member 52. The free end 56 is shouldered at 72 and a nut 74 is provided to complete the mounting or affixing means for this end of the member 52.

As best seen in Figure 5, the member 52 may be described as having a depending curvilinear shape in which the bight or curved part 58 is substantially coextensive with the lower part of the tooth orbit D. Although the bight need not be precisely a curve on a single center and may even constitute related straight portions, the expressions "curved" and "curvilinear" are deemed to be adequate for present purposes. The curvature of the bight 58 is such, relative to the lower part of the tooth orbit D, that the points of the teeth 50 project below the bight or curved part 58 in at least that portion of the orbit in which the teeth move through their crop-moving phases F. As a general proposition, the point of each tooth 50 moves downwardly through the crop-approach zone E and passes below the bight 58 of the stripper member 52 to engage the crops and move the crops over the ground through the phase F, after which the point of the tooth moves upwardly, departing from the crops and moving above the stripper bar so that the crops are stripped from the teeth and the teeth do not wind the crops around the reel.

Although the stripper member 52 is of U shape or curvilinear conformation as viewed from the side or in elevation, it is of zig-zag shape as viewed in plan or from above (Figure 2). The zig-zag conformation is provided by a leading portion 76 and a trailing portion 78. The leading portion 76 constitutes a major portion of the length of the bight 58 and is integral with the leading leg portion 54, terminating in the direction toward the trailing end at a point 80 that lies substantially in the crop-approaching zone E, at which point the bight is provided with a short transverse offset portion 82 that continues the major length portion 76 into the trailing portion 78. The latter portion is a minor part of the length of the bight and itself extends into the trailing leg 56.

As previously described, the rake teeth 50 are arranged in pairs in each set. In Figure 2, the line D represents the plan of the tooth orbit D illustrated in Figure 5, and the line $D^1$ is representative of the tooth orbit of an adjacent tooth of the pair. For present purposes, the line D will be considered. The leading portion 76 that constitutes a major part of the length of the bight 56 of the stripper 52 lies closely adjacent and parallel to that portion of the tooth orbit D in which the tooth moves crops through its crop-moving phase F. However, the minor portion 78 is offset laterally from the plane of the orbit so as to be spaced from the orbit a greater distance than the major portion 76. As previously stated, the offset 78—80—82 lies approximately in the crop-approaching zone E of the tooth 50. This offset creates a tooth-accommodating space 84 which affords increased clearance for the tooth 50 as it moves downwardly into and through the crop-approaching zone E. Consequently, should the tooth 50 have been previously bent, it will not move to the wrong side of the associated stripper member 52, which possibility may be imagined by considering the portion 76 as continued in a straight line in lieu of the offset 78—80—82.

At the same time, the major portion 76, although lying closely adjacent the portion of the orbit in which the point of the tooth 50 moves through the crop-moving phase F, can be made to lie relatively close to the tooth to improve the stripping action thereon. Considering now the next adjacent stripper bar 52 (the third one from the top in Figure 2), it will be seen that the major portion 76 is parallel to although farther from the line $D^1$ than is the offset minor portion 78. However, this does not mean that the tooth 50 that travels through the line $D^1$ is apt to become entangled with the offset portion 78, since the tendency of bending of the teeth is in a direction opposed to the direction indicated by the arrow B. In the particular rake illustrated, the load imposed on the teeth is the result of forces arising from forward movement of the machine as a whole and lateral movement of the teeth in the lower parts of their orbits. Although the major portion 76 of the stripper member at one side of a certain tooth orbit is relatively close to the lower part of that orbit, the next adjacent stripper member 52 has its major portion 76 farther from the related orbit (as $D^1$ in Figure 2), in which case the major portion 76 of the second mentioned stripper member affords greater clearance for the tooth 50 traveling down the path $D^1$ as said tooth is loaded because of engagement with the crops. Therefore, the tooth has greater yieldability without interference with the stripper member.

Various features of the invention not specifically enumerated herein will undoubtedly occur to those versed in the art, as likewise will numerous modifications and alterations in the preferred embodiment of the invention disclosed, all of which may be achieved without departing from the spirit and scope of the invention.

What is claimed is:

1. In a side-delivery rake adapted to advance over a field on which crops lie in previously cut swaths and having a reel-supporting frame including elongated horizontal leading and trailing frame bars spaced apart fore and aft and lying with their length diagonal to the line of travel and journaling a rotatable rake reel of elongated construction arranged lengthwise of and between the frame bars and having a plurality of rake teeth spaced uniformly apart along the length of the reel and arranged to travel, when the reel rotates, respectively in individual curvilinear orbits lying respectively in upright parallel planes spaced laterally and from front to rear so that the point of each tooth travels in its orbit in successive phases of a cycle in which it moves first downwardly ahead of the trailing frame bar to a zone in which it approaches engagement with crops on the ground, then in a direction toward the leading frame bar to sweep the crops over the ground, then upwardly behind the leading frame bar to depart from the crops, and then in a direction toward the trailing frame bar to begin a new cycle: the combination with the rake teeth of a plurality of tooth-strippers carried by the reel frame in uniformly spaced relation lengthwise of the reel to be interspaced with the rake teeth, each stripper comprising a U-shaped member as viewed from the side and including leading and trailing legs affixed respectively to and depending from the leading and trailing frame bars and a bight joining the legs and substantially coextensive with but above the lower part of the associated tooth orbit so that the point of the associated tooth projects below said bight in its crop-moving phase, said bight generally splitting the space between neighboring front and rear orbits and extending from its junction with its leading leg and for a major portion of its length in substantial parallelism with said neighboring orbits to a point substantially in the aforesaid crop-approaching zones of the teeth in said neighboring orbits, and said bight at said point in said zones being offset generally forwardly but short of the neighboring front orbit and then extending laterally rearwardly in a minor portion of its length and well below the trailing frame bar and then turning upwardly to a junction with its trailing leg materially ahead of the neighboring rear orbit to afford increased clearance for the point of the tooth in said neighboring rear orbit as said tooth moves downwardly into and through its crop-approaching zone.

2. In a side-delivery rake adapted to advance over a field on which crops lie in previously cut swaths and having a reel-supporting frame including elongated horizontal leading and trailing frame bars spaced apart fore and aft and lying with their lengths transverse to the line of travel and journaling a rotatable rake wheel of elongated construction arranged lengthwise of and between the frame bars and having a plurality of sets of double rake teeth spaced uniformly apart along the length of the reel and arranged to travel, when the reel rotates, respectively in individual curvilinear double orbits lying respectively in upright parallel planes spaced laterally and from front to rear so that the points of each double tooth travel in their double orbits in successive phases of a cycle in which they move first downwardly ahead of the trailing frame bar to a zone in which they approach engagement with crops on the ground, then in a direction toward the leading frame bar to sweep the crops over the ground, then upwardly behind the leading frame bar to depart from the crops and then in a direction toward the trailing frame bar to begin a new cycle: the combination with the rake teeth of a plurality of tooth-strippers carried by the reel frame in uniformly spaced relation lengthwise of the reel to be interspaced with the sets of rake teeth, each stripper generally splitting the space between the double orbit of one set and the double orbit of a neighboring set, and each stripper comprising a U-shaped member as viewed from the side and including leading and trailing legs affixed respectively to and depending from the leading and trailing frame bars and a bight joining the legs and substantially coextensive with but above the lower parts of the associated double orbits so that the points of the associated teeth project below said bight in their crop-moving phases, said bight as viewed from above and apart from the legs being of zig-zag shape and having a leading major portion of its length substantially parallel to and just ahead of the crop-moving part of the front orbit of one double orbit and substantially parallel and appreciably behind the crop-moving part of the rear orbit of the next adjacent double orbit ahead of said one double orbit, and a trailing minor portion reversed as respects said orbits and located in the aforesaid crop-approaching zone of the associated tooth set and spaced farther ahead of said front orbit of said one double orbit a greater distance than said major portion of said bight to provide for the teeth in said front orbit a tooth-accommodating offset in said zone, said minor portion lying well below the trailing frame bar and being turned upwardly at the rear of said zone to join its trailing legs.

3. A reel-tooth stripper of the character described, comprising: a member of U shape as viewed in elevation and having spaced apart legs including mounting portions at their free ends; and a bight joining the legs, said bight as viewed in plan and exclusive of the legs being of zig-zag shape and including two straight portions substantially parallel to the plane of the bight and joined intermediate the legs by a relatively short transverse portion of said bight, said straight portions constituting respectively major and minor parts of the length of the bight.

References Cited in the file of this patent

UNITED STATES PATENTS

| Number | Name | Date |
|---|---|---|
| 2,621,466 | Kopp | Dec. 16, 1952 |